US010604092B2

(12) United States Patent
Kuwabara et al.

(10) Patent No.: US 10,604,092 B2
(45) Date of Patent: Mar. 31, 2020

(54) BUMPER BEAM STRUCTURE

(71) Applicant: SUBARU CORPORATION, Tokyo (JP)

(72) Inventors: Mitsumasa Kuwabara, Tokyo (JP); Satoshi Ikeda, Tokyo (JP); Syuta Hamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 71 days.

(21) Appl. No.: 15/976,180

(22) Filed: May 10, 2018

(65) Prior Publication Data

US 2018/0345890 A1   Dec. 6, 2018

(30) Foreign Application Priority Data

May 30, 2017  (JP) ................................. 2017-106951

(51) Int. Cl.
*B60R 19/18*   (2006.01)
*B60R 19/34*   (2006.01)

(52) U.S. Cl.
CPC .............. *B60R 19/18* (2013.01); *B60R 19/34* (2013.01); *B60R 2019/186* (2013.01); *B60R 2019/1826* (2013.01)

(58) Field of Classification Search
CPC ... B60R 19/18; B60R 19/34; B60R 2019/186; B60R 2019/1826; B60R 2019/1806
(Continued)

(56) References Cited

U.S. PATENT DOCUMENTS 4,010,969 A * 3/1977 Cantrell ................. B60R 19/02
293/102
6,179,355 B1 * 1/2001 Chou ..................... B60R 19/18
188/377
(Continued)

FOREIGN PATENT DOCUMENTS

JP    2001-225707 A   8/2001
JP    2004-074834 A   3/2004
(Continued)

OTHER PUBLICATIONS

Japanese Office Action dated Nov. 13, 2018 for Application No. 2017-106951.

*Primary Examiner* — Jason S Morrow
*Assistant Examiner* — E Turner Hicks
(74) *Attorney, Agent, or Firm* — Troutman Sanders LLP

(57) ABSTRACT

A bumper beam structure includes a bumper beam that extends in the vehicle-width direction and that has a closed section formed by an outer vertical wall, an inner vertical wall, a top member, and a bottom member and a reinforcing member that is mounted inside the closed section of the bumper beam at the center in the vehicle-width direction of the bumper beam. The reinforcing member has a pair of angled members that diverge in the vehicle-width direction from the outer vertical wall toward the inner vertical wall and, in a minor collision, causes an impact load to act as a tensile force on the inner vertical wall of the bumper beam through the angled members. The angled members are spot-welded to the bottom member with mounting surfaces therebetween. In a major collision, spot welding points fracture after the bumper beam collapses, thereby absorbing impact energy.

2 Claims, 6 Drawing Sheets

(58) Field of Classification Search
USPC .................................. 293/120, 155
See application file for complete search history.

(56) References Cited

U.S. PATENT DOCUMENTS

| | | | |
|---|---|---|---|
| 6,435,579 B1* | 8/2002 | Glance | B60R 19/18 293/102 |
| 6,971,691 B1* | 12/2005 | Heatherington | B60R 19/18 293/102 |
| 2001/0013705 A1 | 8/2001 | Okamura et al. | |
| 2001/0017473 A1* | 8/2001 | Yamamoto | B60R 19/18 293/102 |
| 2002/0180222 A1* | 12/2002 | Janssen | B60R 19/18 293/102 |
| 2007/0120383 A1* | 5/2007 | Schmidt | B60R 19/18 293/102 |
| 2017/0334381 A1 | 11/2017 | Cheng et al. | |

FOREIGN PATENT DOCUMENTS

| | | | |
|---|---|---|---|
| JP | 2008-260364 A | 10/2008 |
| JP | 2009-513439 A | 4/2009 |
| JP | 2010-042753 A | 2/2010 |
| JP | 2010-260516 A | 11/2010 |

\* cited by examiner

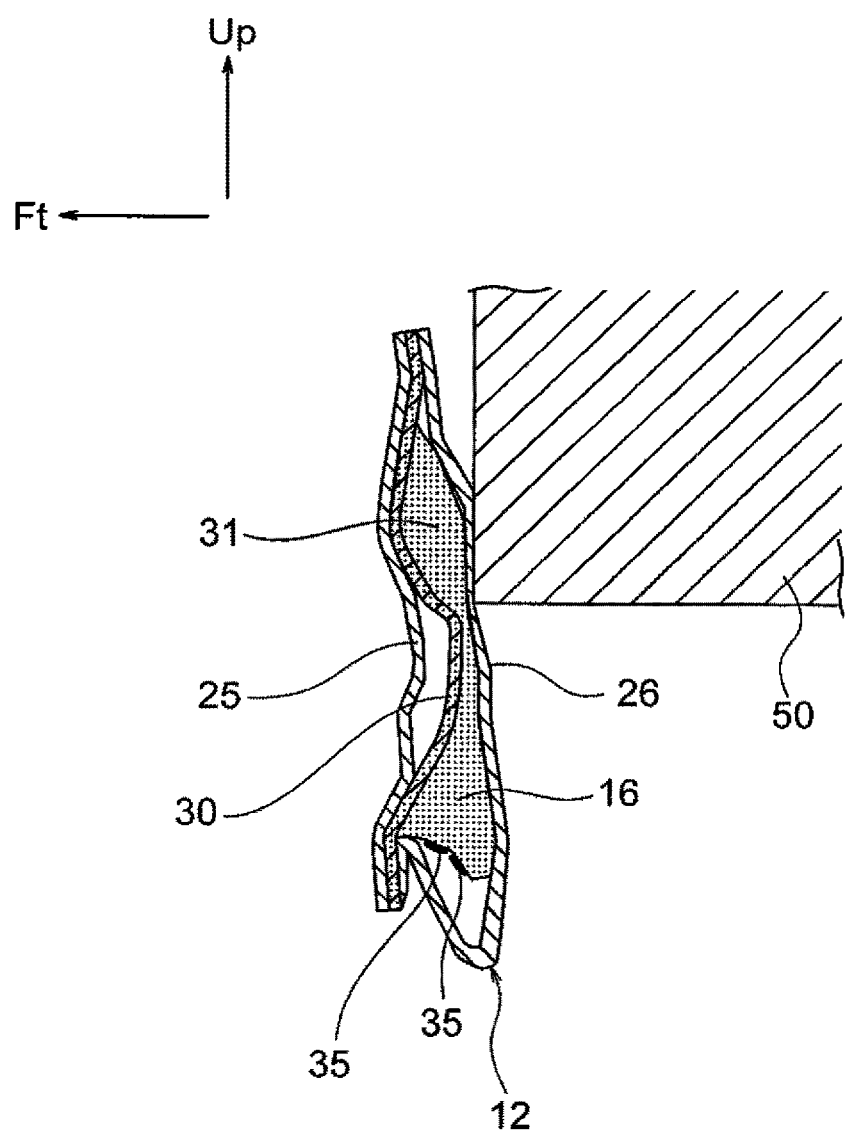

BUMPER BEAM STRUCTURE

CROSS-REFERENCE TO RELATED APPLICATIONS

The present application claims priority from Japanese Patent Application No. 2017-106951 filed on May 30, 2017, the entire contents of which are hereby incorporated by reference.

BACKGROUND

The present invention relates to a bumper beam structure that constitutes a bumper of a vehicle such as an automobile.

A vehicle is provided at a front end thereof with a bumper beam that extends in the vehicle-width direction to protect an occupant and the body of the vehicle against an impact load coming from ahead of the vehicle.

In the event of, for instance, a high-speed collision of the vehicle or a major collision, the bumper beam preferably collapses to as large an extent as possible by minimizing the extent to which its portions remain intact, thereby absorbing as much impact energy as possible. On the other hand, in the event of, for instance, a low-speed collision of the vehicle or a minor collision, the bumper beam preferably minimizes the extent of intrusion of an object with which the vehicle has collided to keep the vehicle body as undamaged as possible, thereby minimizing the cost, including part replacement costs, for repairing damage that the vehicle body sustains from the collision.

A bumper beam structure that accommodates both a high-speed collision and a low-speed collision has long had a bumper beam having an increased closed section area or having an increased plate thickness, thereby improving the bearing capacity of the bumper beam.

In addition, there is known a bumper beam structure having a reinforcing member provided inside the closed section of the bumper beam. In a bumper beam structure described in, for instance, Japanese Unexamined Patent Application Publication (JP-A) No. 2008-260364, a reinforcing member having a hat-shaped horizontal section is mounted inside the closed section of the bumper beam at the center in the vehicle-width direction of the bumper beam. In such a reinforcing member, a hat-shaped opening faces the outside of the vehicle in the longitudinal direction of the vehicle. A flange on the opening is joined to an outer vertical wall that constitutes the closed section of the bumper beam, while a hat-shaped top member is joined to an inner vertical wall that constitutes the closed section of the bumper beam, whereby the flange and the top member are secured to the bumper beam. In addition, the reinforcing member has a pair of angled members that converge in the spacing in the vehicle-width direction therebetween from the hat-shaped opening toward the top member (namely, from the outside of the vehicle toward the inside).

However, an increased closed section area of the bumper beam or an increased plate thickness raises a problem such as an increase in vehicle body weight.

On the other hand, the bumper beam structure described in JP-A No. 2008-260364 has the reinforcing member disposed locally on the bumper beam (at the center in the vehicle-width direction), thereby achieving weight reduction compared with a conventional structure. In addition, damage to the vehicle body can be eliminated or reduced through the use of the reinforcing member in the event of a minor collision, while impact energy can be absorbed through the fracture of the reinforcing member in the event of a major collision.

SUMMARY

A first aspect of the present invention provides a bumper beam structure including a bumper beam that extends in the vehicle-width direction between right and left side frames of a vehicle and that comprises a closed section formed by an outer vertical wall, an inner vertical wall facing the outer vertical wall, a top member, and a bottom member, the top member and the bottom member providing couplings or connections between the outer vertical wall and the inner vertical wall, and a reinforcing member that is mounted inside the closed section of the bumper beam at the center in the vehicle-width direction of the bumper beam, in which the reinforcing member has a pair of right and left angled members that diverge in the spacing in the vehicle-width direction therebetween from the outer vertical wall toward the inner vertical wall and in which the pair of angled members are coupled at ends thereof to the outer vertical wall and are coupled at the other ends to the inner vertical wall and are spot-welded to the top member and/or the bottom member of the bumper beam with a mounting surface therebetween.

BRIEF DESCRIPTION OF THE DRAWINGS

FIG. 6 is a cross-sectional view similar to FIG. 3 illustrating how the bumper beam structure functions in the event of a major collision.

DETAILED DESCRIPTION

Figure 1:
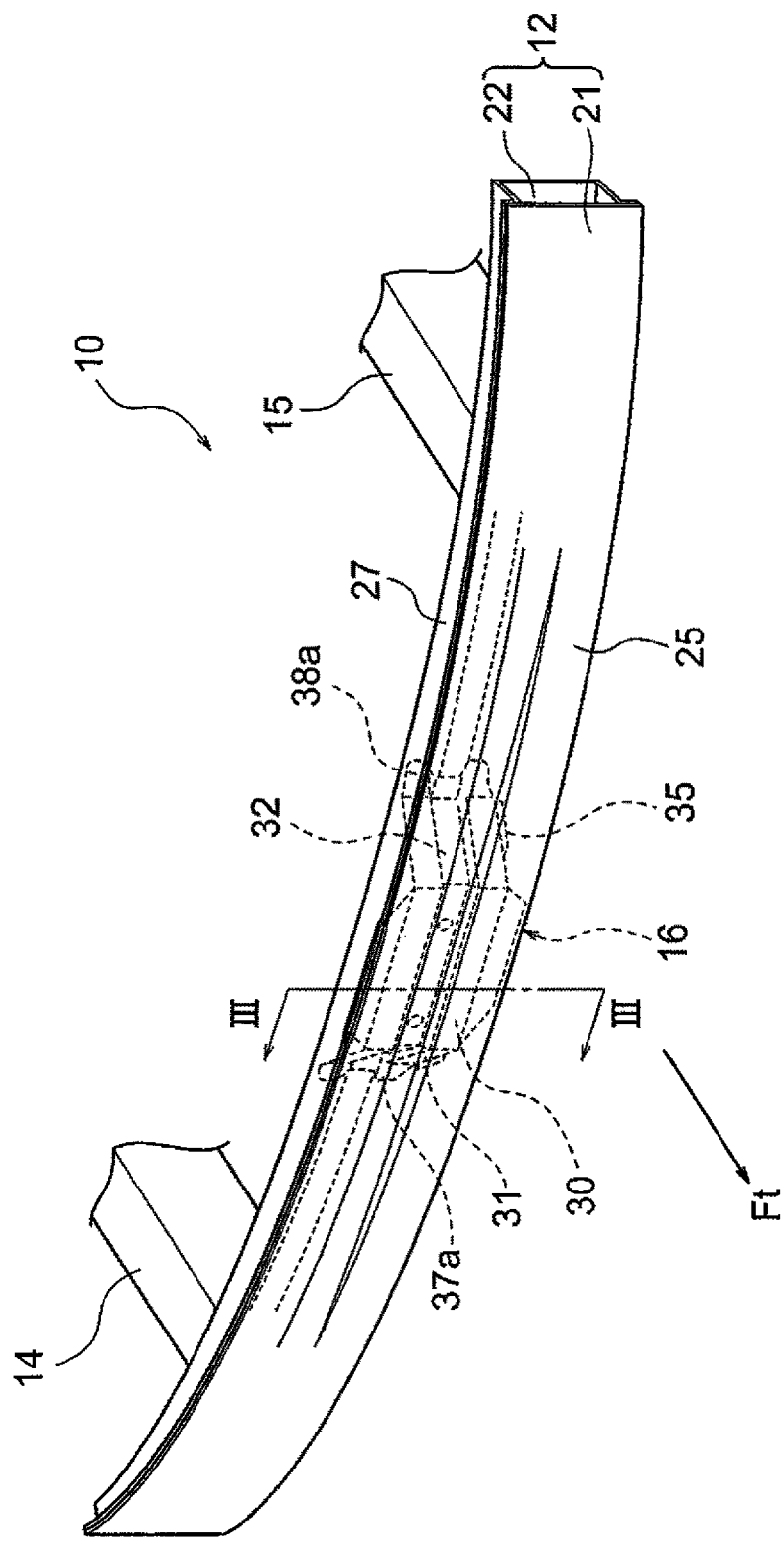
FIG. 1 is a perspective view of a bumper beam structure according to an example of the present invention.

In the following, a preferred but non-limiting example of the present invention is described in detail with reference to the accompanying drawings. Note that sizes, materials, specific values, and any other factors illustrated in the example are illustrative for easier understanding of the present invention, and are not intended to limit the scope of the present invention unless otherwise specifically stated. Further, elements in the following example which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the present invention are unillustrated in the drawings.

Due to being disposed locally on a bumper beam, a reinforcing member does not fracture sufficiently when the bumper beam collapses unevenly in the vertical direction or, for instance, if collapse of the bumper beam concentrates on the upper side or the lower side of the bumper beam, which may make desired absorption of impact energy impossible.

It is desirable to provide a bumper beam structure that provides a reduction in weight and that accommodates both a minor collision and a major collision.

Figure 2:
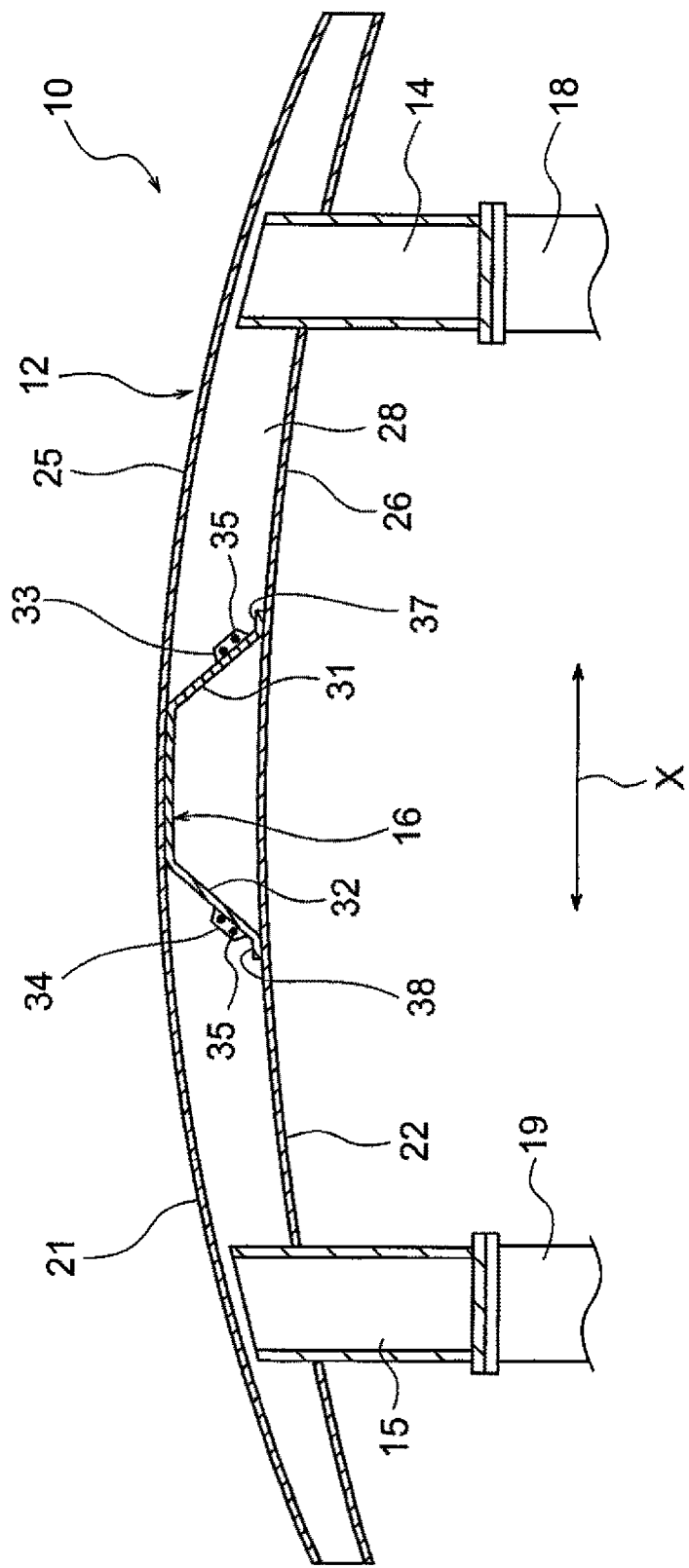
FIG. 2 is a cross-sectional view taken in a horizontal direction along the bumper beam structure illustrated in FIG. 1.
Figure 3:
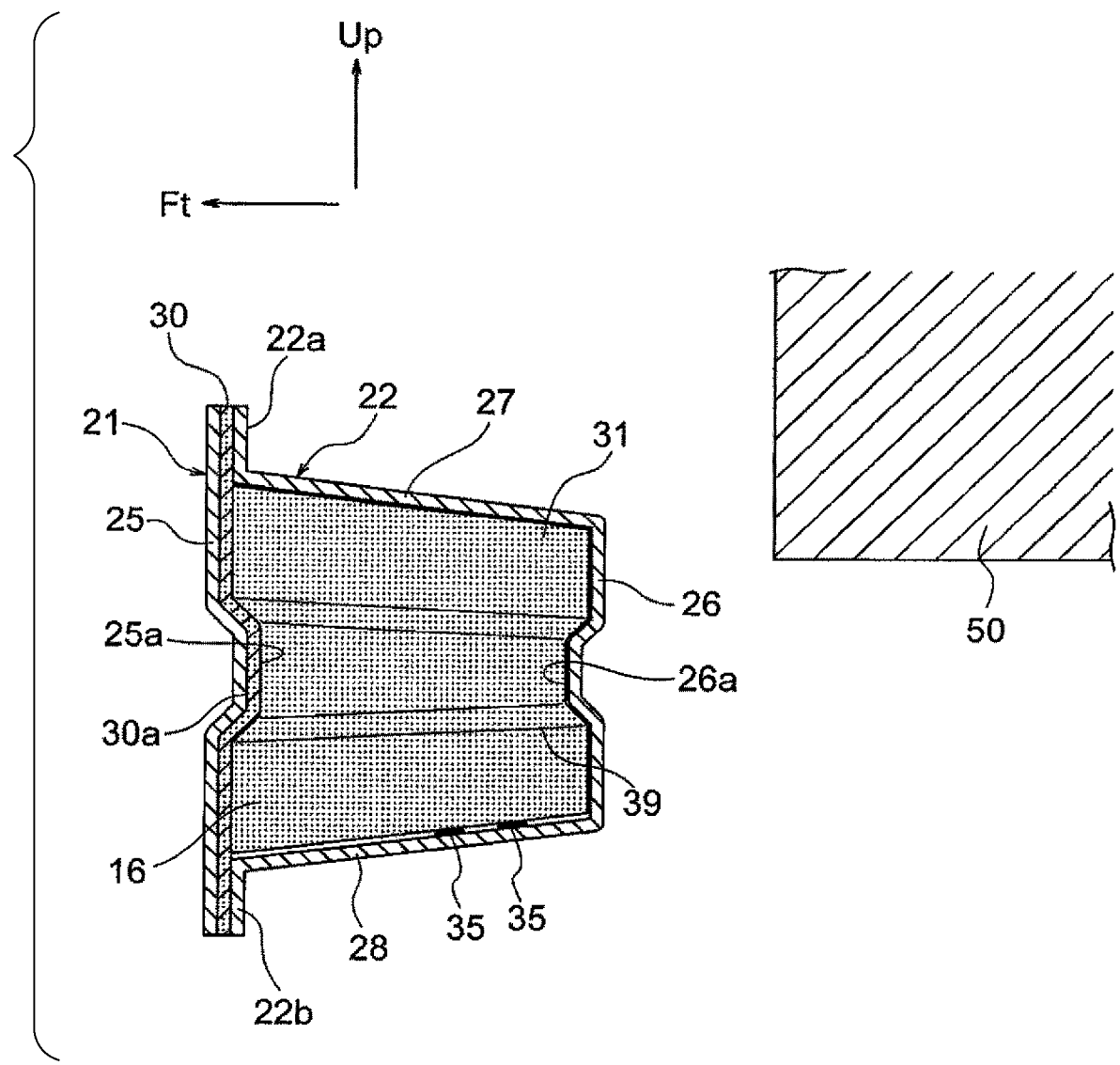
FIG. 3 is a cross-sectional view taken along line III-III in FIG. 1.

FIG. 1 is a perspective view of a bumper beam structure 10 according to an example of the present invention. FIG. 2 is a cross-sectional view taken along the bumper beam structure 10 in a horizontal direction. FIG. 3 is a cross-sectional view taken along line III-III in FIG. 1. The bumper beam structure 10 according to the example of the present invention is applicable to an automobile or other vehicle, including a long bumper beam 12 extending in the vehicle-width direction X, crush boxes 14, 15 disposed at both ends of the bumper beam 12, and a reinforcing member 16 mounted inside the bumper beam 12. In FIG. 3, the reinforcing member 16 is indicated by shaded portions.

The bumper beam 12 is made of a metallic material, such as a steel sheet, or a resin material and functions as a strength member that constitutes a front bumper of the vehicle and that absorbs impact energy in the event of a collision of the vehicle. When mounted on the vehicle, the bumper beam 12 is covered at its front face (part of a vehicle exterior surface) with a bumper face (not illustrated). In this example, the bumper beam 12 has a closed section, including a long plate-like first member 21 that is disposed on the outside in the longitudinal direction of the vehicle and a long plate-like second member 22 that is disposed on the inside of the vehicle so as to oppose the first member 21 and that is bent so as to have a hat-shaped section.

As illustrated in FIGS. 1 and 3, flanges 22a, 22b on the hat-shaped opening side of the second member 22 are joined to an inner surface (a surface on the inside of the vehicle) of the first member 21, thereby forming a substantially rectangular-shaped closed section. Note that FIG. 3 illustrates an engine component 50 that, when mounted on the vehicle, is mounted in an engine compartment behind the bumper beam 12. Such an engine component 50 is, for instance, a crank pulley or the like mounted on a crank shaft of the engine and has higher rigidity than the bumper beam 12.

In the closed section, the first member 21 forms an outer vertical wall 25 disposed on the outside of the vehicle, while, in the closed section, the second member 22 forms an inner vertical wall 26 opposing the outer vertical wall 25, a top member 27 providing a coupling or a connection between upper ends of the outer vertical wall 25 and the inner vertical wall 26, and a bottom member 28 providing a coupling or a connection between lower ends of the outer vertical wall 25 and the inner vertical wall 26. Although the top member 27 and the bottom member 28 slightly converge in the spacing therebetween from the outer vertical wall 25 toward the inner vertical wall 26 in this example, the top member 27 and the bottom member 28 may be parallel to each other in the vehicle-width direction X.

The outer vertical wall 25 and the inner vertical wall 26 have uneven members 25a, 26a, respectively, that are formed on the inside of the closed section at the center in the vehicle-width direction X. The uneven members 25a, 26a are formed by bending the first member 21 and the second member 22, respectively, along a folding line extending in the vehicle-width direction X. The uneven members 25a, 26a according to this example are uneven members having trapezoidal sections that project toward the inside of the closed section at the center in the vertical direction, as illustrated in FIG. 3.

The bumper beam 12 is coupled at both ends thereof in the vehicle-width direction X to ends of right-side and left-side frames 18, 19 (see FIG. 2) extending in the longitudinal direction of the vehicle with crush boxes 14, 15 therebetween.

The crush boxes 14, 15, when mounted, are cylindrical members extending in the longitudinal direction of the vehicle and are formed by subjecting a steel or light alloy plate to press forming. The ends of the crush boxes 14, 15 are coupled to the second member 25 of the bumper beam 12, while the other ends are coupled to the side frames 18, 19. When the vehicle is subjected to an impact load in the longitudinal direction of the vehicle, the crush boxes 14, 15 absorb an impact force through the process of buckling deformation.

Although the bumper beam 12 according to this example is curved in such a manner that its center in the vehicle-width direction projects to the outside of the vehicle, the bumper beam 12 may be configured to extend linearly in the vehicle-width direction.

The reinforcing member 16 is made of a metallic material or a resin material and is disposed inside the closed section at the center in the vehicle-width direction of the bumper beam 12. As illustrated in FIGS. 1 and 2, the reinforcing member 16 includes an outer member 30 that is in contact with the outer vertical wall 25 of the bumper beam 12, a pair of angled members 31, 32 that obliquely extend toward the inside of the vehicle from the outer member 30, and flanges 37, 38 that are formed on ends of the pair of angled members 31, 32, respectively.

The outer member 30 is a plate-like member that is brought into surface contact with and joined to an inner surface of the outer vertical wall 25 of the bumper beam 12. As illustrated in FIG. 3, upper and lower ends of the outer member 30 are held between the outer vertical wall 25 of the bumper beam 12 and the flanges 22a, 22b. The outer member 30 has an uneven fitting member 30a that fits the uneven member 25a of the outer vertical wall 25.

The pair of angled members 31, 32 are plate-like members that diverge in an inverted V-shape from respective vehicle-width ends of the outer member 30 so as to be away from each other in the vehicle-width direction X from the outer vertical wall 25 toward the inner vertical wall 26 of the bumper beam 12. As illustrated in FIGS. 1 and 2, the angled members 31, 32 are provided at lower ends thereof with bottom mounting members 33, 34, respectively, having mounting surfaces that are brought into surface contact with the bottom member 28 of the bumper beam 12.

The bottom mounting members 33, 34, when mounted on the vehicle, are spaced apart from the outer vertical wall 25 and the inner vertical wall 26 of the bumper beam 12 and are secured at the mounting surfaces to the bottom member 28 by means of spot welding. In FIGS. 2 and 3, spot welding points 35 of the bottom mounting members 33, 34 are indicated by black dots. Welding surfaces of the spot welding face the vertical direction. Although each of the bottom mounting members 33, 34 has two welding points, the number of welding points for spot welding may be one or more.

The flanges 37, 38 of the reinforcing member 16 are formed by bending ends of the angled members 31, 32 toward the outside of the vehicle in the vehicle-width direction and are brought into surface contact with and joined to an inner surface of the inner vertical wall 26. As illustrated by dashed lines in FIG. 1, the flanges 37, 38 have uneven fitting members 37a, 38a that fit the uneven member 26a of the inner vertical wall 26.

As described above, the angled members 31, 32 are secured at ends thereof to the outer vertical wall 25 with the outer member 30 and are secured at the other ends (tips) to the inner vertical wall with the flanges 37, 38. In addition, as illustrated in FIGS. 1 and 3, the angled members 31, 32 are bent along folding lines 39 extending in the direction in which the angled members 31, 31 are angled. The folding lines 39 are formed so as to couple folding lines formed on the outer vertical wall 25 and the inner vertical wall 26 to one another.

Next, the bumper beam structure 10 is described below with regard to function associated with a collision of the vehicle.

Figure 4:
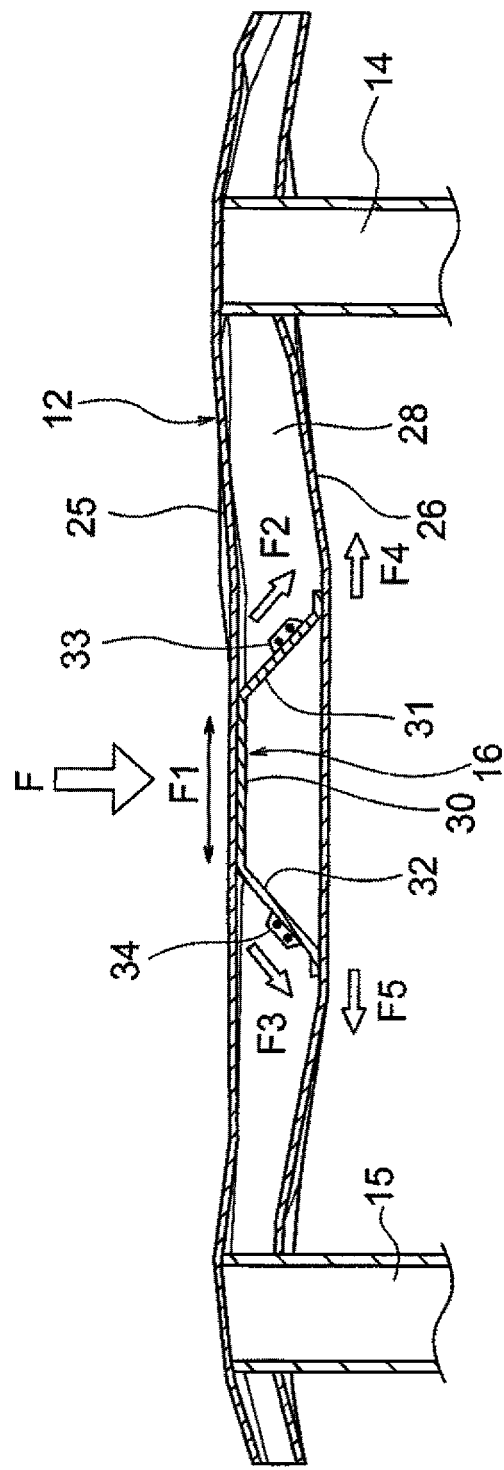
FIG. 4 is a cross-sectional view illustrating how the bumper beam structure functions in the event of a minor collision.

FIG. 4 is a cross-sectional view taken along the bumper beam structure 10 in the horizontal direction, illustrating how the bumper beam structure 10 functions in the event of a minor collision.

When the vehicle collides at a low speed (minor collision) and, as a result, an impact load F is exerted on the bumper beam 12 from the front of the vehicle, a tensile force (see arrow F1 in FIG. 4) acts on the outer vertical wall 25 of the bumper beam 12. The impact load transmitted via the outer member 30 of the reinforcing member 16 is distributed to the right and left angled members 31, 32 (loads F2 and F3) and is then transmitted to the inner vertical wall 26 of the bumper beam 12 (loads F4 and F5). Consequently, a tensile force acts on the inner vertical wall 26. Through the generation of a reactive force against such a tensile force, a high reactive force caused by the outer vertical wall 25 and the inner vertical wall 26 can be used to prevent or reduce intrusion of the bumper beam 12 into a passenger compartment, while buckling or bending of the outer vertical wall 25 and the inner vertical wall 26 can be reduced or eliminated.

In a bumper beam structure provided with a conventional reinforcing member, a pair of angled members of the reinforcing member are formed in such a manner as to converge in the spacing in the vehicle-width direction therebetween toward the inside of the vehicle from the outside (in other words, formed in a V-shape, as opposed to that of the angled members 31, 32 according to this example). This bumper beam structure depends mainly on the rigidity of the reinforcing member to resist an impact load. As a result, the outer vertical wall of the bumper beam and the reinforcing member are likely to sustain buckling and bending. The bumper beam structure 10 according to this example, however, uses the pair of angled members 31, 32 to cause a tensile force to act on the inner vertical wall 26 of the bumper beam 12, thereby preventing or reducing intrusion while preventing or reducing buckling or bending. Consequently, damage to the vehicle body can be eliminated in the event of a minor collision.

Figure 5:
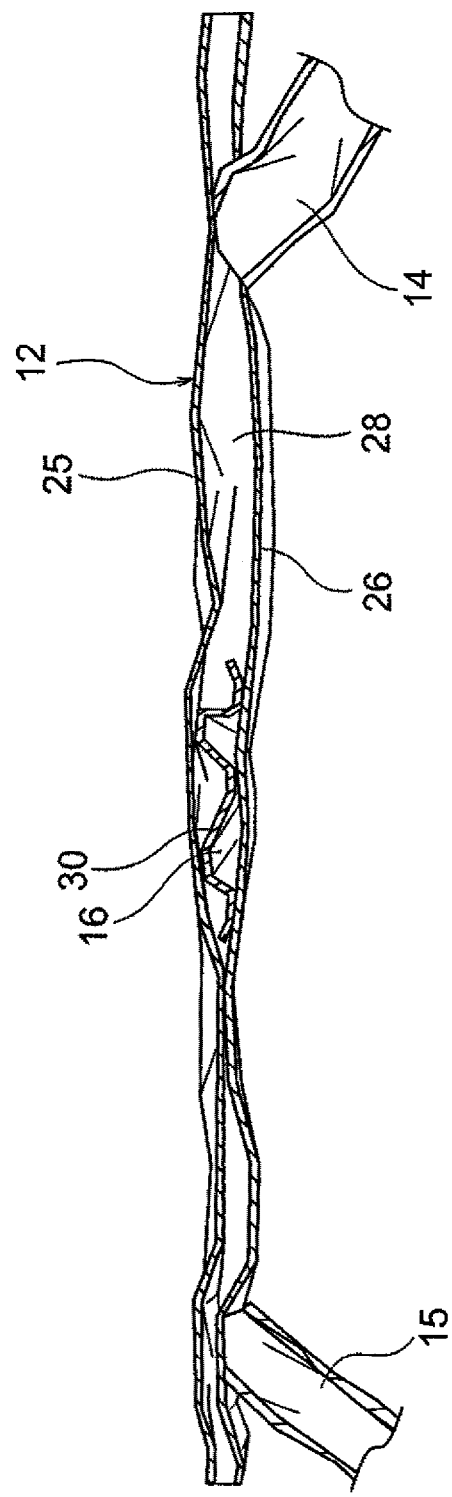
FIG. 5 is a cross-sectional view illustrating how the bumper beam structure functions in the event of a major collision.

Next, how the bumper beam structure 10 functions when the vehicle collides at a high-speed (major collision) is described below. FIGS. 5 and 6 are cross-sectional views illustrating how the bumper beam structure 10 functions in the event of a major collision. FIG. 5 is a cross-sectional view taken along the bumper beam structure 10 in the horizontal direction. FIG. 6 is a vertical cross-sectional view taken at the vehicle-width center in the vertical direction.

When the vehicle collides with an object at a high speed, the bumper beam 12 is pushed toward the inside of the vehicle by the object intruding from the front of the vehicle and is crushed after coming into contact with the highly rigid engine component mounted therebehind. The bumper beam 12 subjected to a compressive force in the longitudinal direction of the vehicle deforms in such a manner as to expand in the vertical direction. As a result, the spot welding points 35 providing a coupling between the reinforcing member 16 and bumper beam 12 are subjected to a tensile force acting in the vertical direction.

Spot welding provides high strength against a shearing force that acts horizontally on the welding surface, but is less effective against a tensile force that acts vertically on the welding surface (namely, a tensile force acting vertically on the spot welding points 35). For this reason, the spot welding points 35 fracture when subjected to a tensile force acting in the event of a major collision, thereby enabling impact energy to be reliably absorbed. In addition, as a result of the fracture of the spot welding points 35, the bumper beam 12 and the reinforcing member 16 are more likely to crush, thereby ensuring a crush stroke. Furthermore, the crush boxes 14, 15 buckle and deform in the event of a major collision, thereby enhancing the absorption of impact energy.

Even if the engine component 50 is disposed below the bumper beam 12 or at the same level as the bumper beam 12 in the vertical direction, the bumper beam 12 crushes in such a manner as to expand in the vertical direction, though not illustrated. With this arrangement, even if the bumper beam 12 crushes unevenly due to the difference in the vertical position of the engine component 50, the spot welding points 35 fracture, thereby enabling impact energy to be absorbed as desired.

In place of the bottom mounting members 33, 34 or together with the bottom mounting members 33, 34, top mounting members that come into surface contact with the top member 27 of the bumper beam 12 may be provided at upper ends of the angled members 31, 32 and be joined to the top member 27 of the bumper beam 12 by means of spot welding. Preferably, these spot welding points may be formed at least on the bottom member 28 if the engine component 50 that comes into contact with the bumper beam 12 in the event of a collision is located above the bumper beam 12, and may be formed at least on the top member 27 if the engine component 50 is located below the bumper beam 12.

As described above, the bumper beam structure 10 according to this example has the reinforcing member 16 disposed at the center in the vehicle-width direction of the bumper beam 12. Compared with a structure having an increased closed section area of the bumper beam or having an increased plate thickness, this arrangement helps to reduce the vehicle body weight as well as prevents or reduces damage to the vehicle body in the event of a minor collision while leaving no members remaining intact in the event of a major collision.

In addition, the fitting members 30a, 37a, 38a fit the uneven fitting members 25a, 26a of the bumper beam 12, thereby preventing the reinforcing member 16 from becoming out of alignment with the bumper beam 12. This arrangement enables an impact load to act on the reinforcing member 16 more appropriately in the event of a collision, whether minor or major. The uneven fitting members 25a, 26a and the fitting members 30a, 37a, 38a may be formed on any one of the outer vertical wall 25 and the inner vertical wall 26.

The present invention is typically described with reference to, but not limited to, the foregoing example. Various modifications are conceivable within the scope of the present invention.

For instance, the pair of angled members of the reinforcing member 16 may not be integrated with each other and may be divided into the left-side angled member 32 and the right-side angled member 31.

In addition, although the bumper beam structure 10 that constitutes the front bumper disposed at the front end of the vehicle is described in the above example, the bumper beam structure according to the example of the present invention may also constitute a rear bumper disposed at the rear end of the vehicle.

The invention claimed is:

1. A bumper beam structure comprising:
a bumper beam that extends in a vehicle-width direction between right and left side frames of a vehicle and that comprises a closed cross section formed along entire length of the bumper beam by use of an outer vertical wall, an inner vertical wall facing the outer vertical wall, a top member, and a bottom member, the top member and the bottom member providing couplings or connections between the outer vertical wall and the inner vertical wall; and
a reinforcing member that is mounted inside the closed section of the bumper beam at a center in the vehicle-width direction of the bumper beam,
wherein the reinforcing member comprises a pair of right and left angled members that diverge in a spacing in the vehicle-width direction therebetween from the outer vertical wall toward the inner vertical wall, the angled members have mounting surfaces, positioned apart from the outer vertical wall and the inner vertical wall, to be brought into surface contact with the bottom member of the bumper beam; and
wherein the pair of angled members are coupled at ends thereof to the outer vertical wall and are coupled at other ends thereof to the inner vertical wall and are spot-welded to the bottom member of the bumper beam with the mounting surfaces.

2. The bumper beam structure according to claim 1,
wherein the bumper beam comprises uneven surfaces formed in the outer vertical wall and the inner vertical wall; and
wherein the reinforcing member comprises fitting portions that fit the uneven surfaces when mounted.

\* \* \* \* \*